Patented Feb. 13, 1940

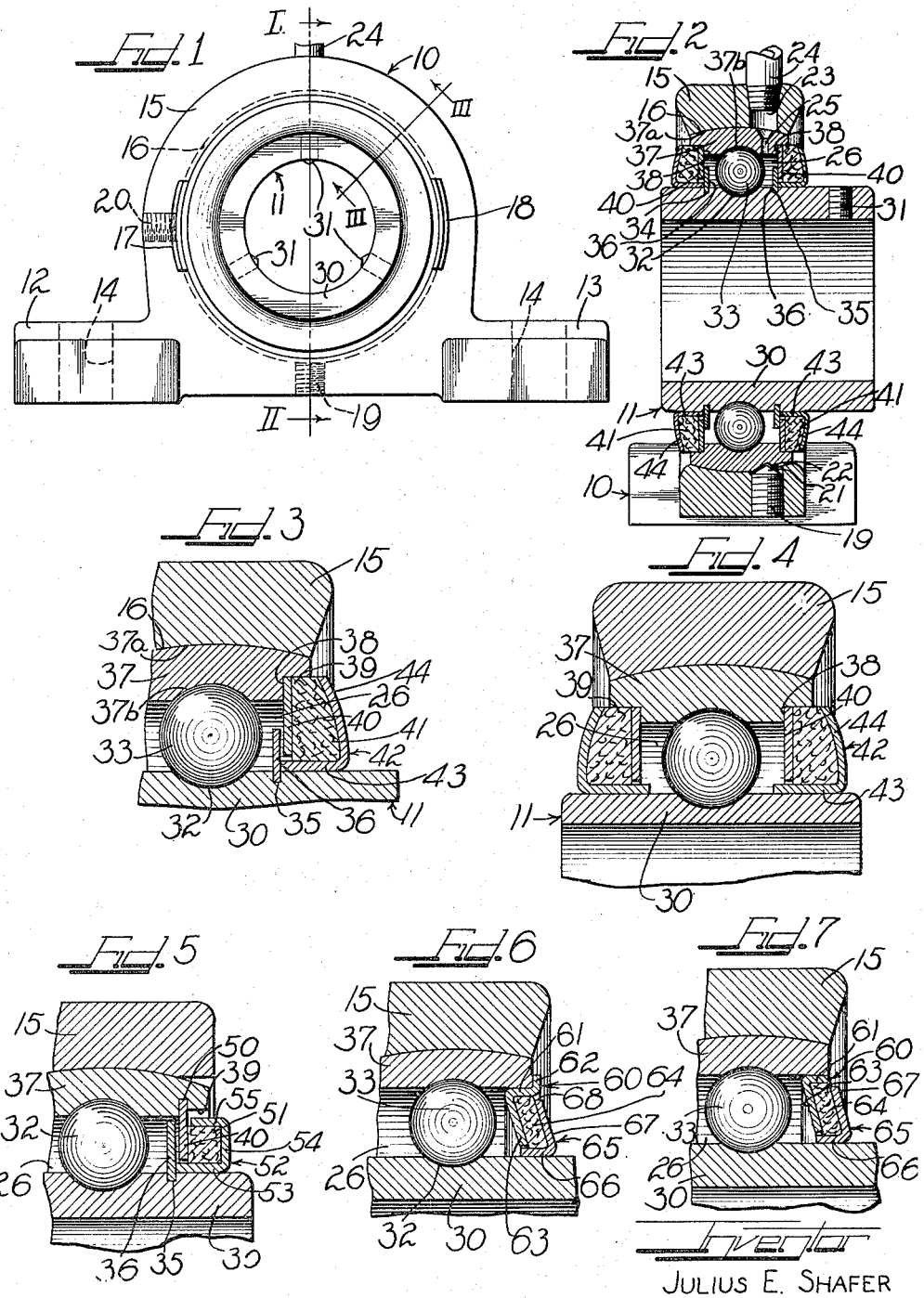

2,189,838

UNITED STATES PATENT OFFICE 2,189,838

BEARING

Julius E. Shafer, Chicago, Ill., assignor to Monad Corporation, Chicago, Ill., a corporation of Illinois Application August 11, 1937, Serial No. 158,449

6 Claims. (Cl. 308—187.2)

This invention relates to sealed bearings and more specifically relates to sealed antifriction bearings including a flexible sealing washer carried in a metal housing on a race ring of the bearing.

This application is a continuation-in-part of my copending application entitled "Bearings" Serial No. 109,402, filed November 6, 1936.

In my U. S. Patent No. 2,033,156, entitled "Bearings", dated March 10, 1936, there is described and claimed sealed bearing constructions wherein the race rings of the bearings carry flingers or retaining members extending therefrom into overlapping relation so as to seal the bearings against ingress of dirt and loss of lubricant.

According to the present invention, a compressible washer, such as a felt or leather washer, for example, is disposed against the outer flinger or retaining member of the bearing and is carried in a metal housing pressed onto or otherwise secured to one of the race rings of the bearing or to a structure revolving with one of the race rings. The washer may be, if desired, pressed from its flat annular shape so as to impart a slope thereto by the flinger and housing member. It has been found that a slope of about 15° from the flat position is desirable to increase the sealing properties of the washer. The washer, therefore, serves as an added seal against the leakage of lubricant from the bearing and ingress of dirt to the bearing.

While the sealed bearings of this invention are not limited for use in pillow block mountings, I have shown on the drawing a suitable pillow block mounting for the bearings of this invention, wherein the bearings can be inserted as a unit into a one-piece pillow block through slots provided in the race ring of the pillow block. The bearing is held in adjusted position in the pillow block by a plurality of set screws adapted to be seated in depressions formed in the outer race ring of the bearing. These set screws hold the outer race ring of the bearing against rotation in the pillow block, at the same time, however, permitting limited tilting of the bearing in the pillow block. A lubricant passageway can be provided in the pillow block in communication with a lubricant passageway formed through the outer race ring of the bearing. The set screws in the pillow block will hold the bearing in alignment with the lubricant passageway in the pillow block, so that grease or oil fed through the pillow block passageway enters the sealed antifriction compartment of the bearing.

It is then an object of this invention to provide bearing constructions having compressible washers fixedly mounted thereon for sealing the bearings.

A further object of this invention is to provide sealed bearing units having compressible washers carried from a race ring structure of the bearings.

A further object of this invention is to provide a member for housing a compressible washer adapted to seal a bearing against ingress of dirt and loss of lubricant.

Another object of this invention is to equip sealed bearing constructions having flingers or retaining members extending from one or both of the race rings of the bearing with an added seal carried from one of the race rings.

Another object of this invention is to provide a sealing structure for anti-friction bearings including spaced opposed metal flingers or sealing rings carried respectively by the inner and outer race ring structures of the bearings and having a compressible washer disposed therebetween.

Other and further objects of this invention will become apparent to those skilled in the art from the following detailed description of the annexed sheet of drawings which disclose preferred embodiments of the invention.

On the drawing:

Figure 1 is a side elevational view of a sealed bearing unit according to this invention mounted in a one-piece pillow block.

Figure 2 is a vertical cross sectional view, with parts in elevation, taken substantially along the line II—II of Figure 1.

Figure 3 is an enlarged fragmentary cross sectional view, with a part in elevation, taken substantially along the line III—III of Figure 1.

Figure 4 is an enlarged fragmentary vertical cross sectional view taken through a pillow block and modified sealed bearing according to this invention.

Figure 5 is an enlarged fragmentary vertical cross sectional view taken through a pillow block and a further modified sealed bearing construction according to this invention.

Figure 6 is a fragmentary vertical cross sectional view taken through a pillow block and another modified sealed bearing construction according to this invention wherein the flinger and housing for the compressible washer are provided with sloping faces to tip the compressible washer therebetween out of a vertical plane.

Figure 7 is a fragmentary vertical cross sectional view taken through a pillow block and another form of sealed bearing construction according to this invention similar to the construction shown in Figure 6.

As shown on the drawing:

In Figures 1 and 2 the reference numeral 10 designates generally a one-piece pillow block having a sealed bearing unit 11 mounted therein. The pillow block 10 is provided with feet 12 and 13 having holes or slots 14 formed therethrough for receiving bolts to rigidly attach the pillow block to a supporting structure (not shown). An annular strap portion 15 is formed intermediate the feet 12 and 13 and is provided with a concave or depressed inner face 16 forming a bearing surface for the outer race ring of the sealed bearing unit 11.

Slots or grooves 17 and 18 are formed in the strap portion 15 on the inner wall thereof to permit insertion of the bearing unit 11 horizontally into the pillow block. The bearing, when thus inserted in the slots 17 and 18, can then be rotated into a vertical position to be seated on the bearing wall 16 of the strap 15.

Screws 19 and 20 are threaded respectively through the base and side of the pillow block 10, as shown in Figure 1. The screw 20 is threaded through the side of the pillow block 10 at about the middle of the slotted portion 17 of the pillow block.

As best shown in Figure 2, the screws have pointed ends such as 21 thereon for seating in depressions such as 22 formed in the outer race ring of the bearing unit 11. The outer race ring of the bearing unit 11 is thus locked against rotation in the pillow block, although tilting movements of the bearing are permitted to a limited extent by the depressions 22 being larger than the pointed ends 21 of the screws.

The top portion of the pillow block strap 15 has a bore 23 extending therethrough for receiving the end of a grease or oil cup, such as 24. The bore 23 of the strap 15 communicates with a bore 25 formed through the outer race ring of the bearing unit as best shown in Figure 2. The screws 10 and 20 hold the bore 25 in alignment with the bore 23 and lubricant can thus be readily supplied from the cup 24 to the sealed bearing chamber 26 of the bearing unit 11.

The bearing 11, as shown in Figures 1 to 3, comprises an inner race ring 30 adapted to be disposed around a shaft or other rotating member (not shown) and secured thereto by means of locking screws 31 adapted to bite into or frictionally engage the periphery of the member around which the race ring is mounted. The race ring structure can assume many different forms without departing from the scope of this invention, and any structure can be used that provides an inner raceway 32 for balls 33 or other anti-friction elements such as, for example, rollers, needles, or the like.

Grooves 34 and 35 (Figures 2 and 3) are provided in the outer periphery of the race ring 30 on each side of the raceway 32 thereof for receiving therein flinger or retaining members 36. The members 36 are metal rings adapted to be pressed into the grooves 34 and 35 and extend radially from the outer periphery of the race ring 30.

An outer race ring 37 is disposed around the race ring 30 and is provided with a convex exterior raceway 37a for bearing cooperation with the concave surface 16 of the pillow block. The race ring 37 also has an interior raceway 37b to receive the balls 33 or other anti-friction elements.

The inner edges of the race ring 37 are cut away to provide shoulders 38 with circular base portions 39, as best shown in Figure 3.

Flingers or retaining members 40 are pressed into the cut away portions into abutment with the shoulders 38. These retaining members 40 are annular metal rings extending radially inward from the race ring 37 and are held integral with the race ring by frictional engagement with the circular bases 39 of the cut away portions of the ring. The retaining members are in spaced relation from the flingers 36 and also terminate in spaced relation from the inner race ring 30.

Compressible washers, such as felt washers 41, preferably of rectangular cross section are seated in metal housings 42 having flat annular bases 43 and radially extending side walls 44 with the inner periphery of the washer seated on the base portion and a side wall of the washer seated against the side wall 44 of the housing. The housings 42 are pressed onto the inner race rings 30 until their bases 43 abut the inner flingers or retaining members 36. The inner side walls of the washers thus abut the retaining members 40 carried by the outer race ring 37.

The washers 41 should not be materially pressed against the flingers or retainers, since they move relative thereto with the housings 42. On the other hand, the washers must act as sealing means and should not be spaced from the flingers or retainers 40.

The side walls 44 of the housing 42 are preferably bent inwardly to slightly compress the outer periphery of the washer 41 and thereby obtaining a further sealing of the chamber 26 of the bearing unit without compressing the entire washer against the retainers 40.

In operation the inner flingers or retainers 36 travel with the inner race ring 30, while the outer flingers 40 travel with the outer race ring 37. The washers 41 usually travel with the housing 42 due to their extended contact therewith, but movement of the washers with either of the race rings is not essential for a sealing of the bearing, provided, of course, that the washer is not spaced from the outer flingers or retainers 40 and the bases 39 of the cut away portion in the outer race ring 37. It is evident that the flingers or retainers carried by the inner and outer race rings in overlapping relation effect a sealing of the bearing chamber 26 against leakage of lubricant and ingress of dirt and that the compressible washers provide an added sealing for the chambers.

In the modification disclosed in Figure 4, identical parts have been marked with the same numerals used in Figures 1 to 3. In this modification, however, the flingers 36 disclosed in Figures 2 and 3 are dispensed with and the housing 42 is pressed onto the outer periphery of the inner race ring 30 by a die set to stop at a predetermined point so that the bases 43 of the housing will not contact the anti-friction elements in the chamber 26. The bases 43 of the housings, however, extend under the flingers 40 in spaced relation therefrom.

In the modification shown in Figure 5, parts identical with parts described in Figures 1 and 3 have been marked with the same reference numerals. In this modification, however, the outer flingers or retainers 40 are pressed into grooves 50 cut in the base 39 of the cut away portion of the inner edges of the outer race ring 40, so that these outer flingers or retainers 40 are sprung into the grooves 50 to be rigidly held by the outer race ring 37.

Felt washers such as 51 are mounted in a different type of housing 52 having an inner peripheral wall or base 53 pressed onto the inner race ring 30 into abutment with the inner flinger 35, a vertical side wall 54 and a flat horizontal outer peripheral wall 55 in spaced relation from the base 39 of the cut away portion of the outer race ring 37. The housing 52, therefore, surrounds the washer 51 on three sides and holds the washer against the outer flinger 40 to seal the chamber 26 of the bearing.

In the modification shown in Figure 6, parts identical with parts described in Figures 1 to 3 have been marked with the same reference numerals. In Figure 6, however, the outer race ring 37 does not have the inner edges thereof cut away. A flinger or retaining member designated generally by the reference numeral 60 is carried by the outer race ring 37. The retainer 60 has a flat annular outer periphery 61 adapted to be pressed into tight frictional engagement with the inner surface of the race ring 37. A flange 62 extends outwardly from the peripheral base 61 of the retainer 60 for abutting the side of the race ring 37 to limit the amount that the retainer is pressed into the race ring.

A side wall 63 extends inwardly from the periphery 61 of the retainer 60 at about a 15° angle from the vertical and terminates in spaced relation from the inner race ring 30.

A felt washer 64 is adapted to seat against the inner surfaces of the walls 61 and 63 of the retainer 60 as shown.

A housing member 65 having a flat circular base 66 and a sloping side wall 67 is pressed onto the inner race ring 30. The side wall 67 of the housing 65 slopes about 15° from the vertical so as to be parallel with the side wall 63 of the retainer 60. The base 66 of the housing fits under the side wall 63 of the retainer and a working clearance is provided between these members.

The washer 64 may initially be a flat felt ring but, when disposed between the retainer and the housing, assumes a sloping or parallelogram shape.

The side wall 67 of the housing terminates at 68 under the periphery 61 of the retainer 60.

It has been found that this sloping arrangement of the side walls for the retainer and housing gives an excellent operating clearance between the relatively movable parts and at the same time prevents the centrifugal discharge of lubricant from the sealed chamber 26 of the bearing. Since the lubricant is thrown tangentially from a rotating part it must strike some part of the sloping washer in an attempted passage from the sealed chamber. This of course stops the flow or movement of the lubricant so that it cannot be discharged.

In the modification shown in Figure 7, an arrangement substantially identical with the arrangement shown in Figure 6 is disclosed. However, in Figure 7 the flange 62 on the retainer 60 is omitted, and this retainer 60 is pressed into the outer race ring 37 by means of a die set to stop when the end of the periphery 61 of the retainer is flush with the outer edge of the race ring 37.

If desired, however, the edges of the outer race ring 37 can be cut away as shown in Figures 1 to 4 to provide shoulders therein and the retainer 60 can be pressed into the outer race ring until it abuts these shoulders.

From the above description, it should be understood that the retainer and housing for receiving the compressible washer thereagainst can assume many different forms without departing from the scope of this invention and that the invention includes the sealing of bearings equipped with one or more pairs of flingers or retaining members by compressible washers held against the retaining members in housings carried by a race ring structure other than the race ring structure carrying the retainers.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A seal for bearings having inner and outer race rings and which comprises an annular retainer member having an outer annular face adapted to be pressed into the outer race ring of a bearing, said retainer having an inner side wall extending inwardly from the inner end of said face and sloping toward the other end thereof, a flinger having an inner annular face adapted to be pressed onto the inner race ring of a bearing to extend under the side wall of the retainer, said flinger also having an outer flange extending outwardly from the outer edge of said face and sloping toward the other edge, said flinger and retainer side walls being in spaced relation, and yieldable means seated between the annular faces and sloping walls of the retainer and flinger to fill the space therebetween.

2. A seal for bearings having inner and outer race rings which comprises an annular retainer member adapted to be fitted into the outer race ring of a bearing, said retainer when fitted into the outer race ring having a side wall extending inwardly into spaced relation from the inner race ring, a flinger having an inner base adapted to be pressed onto the inner race ring of a bearing to extend under the side wall of the retainer, the edge of said base extending above the race ring to define a wall, said flinger also having an upturned flange extending from the other edge of said base toward the outer race ring, and a yieldable washer disposed around said base of the flinger between the flange thereof and the retainer to fill the space therebetween, said washer being exposed at the outer peripheral edge of the flinger flange.

3. A sealed bearing having inner and outer race rings in spaced relation with anti-friction elements therebetween which comprises a retaining member having a peripheral face adapted to be pressed into the outer race ring, said member also having an inner side wall extending inwardly from said face and sloping backward, the inner edge of said side wall being in spaced relation from the inner race ring when assembled in the bearing, a flinger having an inner face adapted to be pressed onto the inner race ring and extend through the space between the inner edge of the retaining member side wall and the inner race ring, said flinger also having an outer side wall extending outwardly from said face and sloping toward the retaining member in spaced relation therefrom, and yieldable means seated between said side walls and faces of the retainer and flinger filling the space therebetween, said yieldable means being exposed at the outer peripheral edge of the flinger side wall.

4. In a bearing having inner and outer race rings in spaced concentric relation and anti-friction elements between the race rings cooperating therewith, the improvement which comprises a seal for the space between the race rings to define a closed lubricant retaining chamber for the anti-friction elements, said seal including a retainer member pressed into the outer race ring and having a portion extending inwardly into spaced relation from the inner race ring, a flinger having a base pressed onto the inner race ring and projecting beyond the inwardly extending portion of the retainer through the space between the retainer and inner race ring for defining the side wall of a lubricant channel whereby lubricant thrown by centrifugal force from said channel will not flow under the retainer, said flinger also having a side wall extending outwardly from said base toward the outer race ring in spaced relation from the inwardly extending portion of the retainer, and a yieldable sealing ring between the flinger and retainer and filling the space therebetween.

5. A sealed bearing unilt comprising inner and outer race ring structures, anti-friction elements therebetween, a retainer carried by the outer race ring structure having a side wall extending radially inwardly from a point axially spaced from the outer end of said race ring structure to a point near the inner race ring structure, said side wall sloping back toward said outer end, an outer member carried by the inner race ring structure having a side wall extending radially outwardly from a point axially spaced from the retainer side wall to a point near the outer race ring structure, said side wall of the member sloping in the same general direction as the retainer side wall to define a chamber therewith, and yieldable means filling said chamber and exposed at the outer peripheral edge of the outer member side wall.

6. In a bearing having inner and outer race rings in spaced concentric relation and anti-friction elements between the race rings cooperating therewith, the improvement which comprises a seal for the space between the race rings to define a closed lubricant-retaining chamber for the anti-friction elements, said seal including a retainer carried by the outer race ring and extending inwardly into spaced relation from the inner race ring, a flinger having a base pressed onto the inner race ring extending into spaced relation from the inner end of the retainer, said flinger having an upturned outer flange extending from the outer edge of the base and turned in toward the retainer member, and a yieldable sealing ring disposed around said base of the flinger between the flinger and retainer and exposed at the outer peripheral edge of the flinger flange.

JULIUS E. SHAFER.